United States Patent
Zhu et al.

(10) Patent No.: US 12,006,479 B1
(45) Date of Patent: Jun. 11, 2024

(54) SYSTEMS AND PROCESSES FOR REFORMING A LIQUID HYDROCARBON FUEL

(71) Applicant: Saudi Arabian Oil Company, Dhahran (SA)

(72) Inventors: Guanghui Zhu, Dhahran (SA); Maryam M. Al-Taher, Dammam (SA); Qingyuan Hu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/066,521

(22) Filed: Dec. 15, 2022

(51) Int. Cl.
*C10G 27/04* (2006.01)
*B01J 31/02* (2006.01)
(Continued)

(52) U.S. Cl.
CPC .......... *C10G 27/04* (2013.01); *B01J 31/0271* (2013.01); *B01J 35/56* (2024.01); *B01J 35/66* (2024.01);
(Continued)

(58) Field of Classification Search
CPC .. C10G 27/04; C10G 61/02; C10G 2300/307; C10G 2300/4068; C10G 2300/80;
(Continued)

(56) References Cited

U.S. PATENT DOCUMENTS 2,767,123 A 10/1956 Hickok et al.
8,353,155 B2 1/2013 Lewis et al.
(Continued)

FOREIGN PATENT DOCUMENTS

WO WO-2004044095 A2 * 5/2004 ............. B01B 1/005
WO WO-2008150451 A2 * 12/2008 .......... B01J 19/0093

OTHER PUBLICATIONS

Hermans et al., "Silica-immobilized N-hyroxyphthalimide: An efficient heterogeneous autoxidation catalyst", Journal of Catalysis, vol. 251, pp. 204-212, 2007.
(Continued)

*Primary Examiner* — Ellen M Mcavoy
*Assistant Examiner* — Chantel Graham
(74) *Attorney, Agent, or Firm* — DINSMORE & SHOHL LLP (57) ABSTRACT

According to one or more other aspects of the present disclosure, a system for reforming a liquid hydrocarbon fuel includes a mixing zone with a fuel intake fluidly coupled to a liquid hydrocarbon fuel source and an oxygen-containing gas intake fluidly coupled to an oxygen-containing gas source. The mixing zone further includes at least one atomizing nozzle and a fuel distribution zone downstream the at least on atomizing nozzle. The system also includes a catalyst reaction zone downstream the mixing zone, including a monolith block having a plurality of flow channels defined by monolith walls and a reforming catalyst coated onto the monolith walls. The atomizing nozzle generates a plurality of droplets comprising the liquid hydrocarbon fuel suspended in oxygen-containing gas. The fuel distribution zone distributes the plurality of droplets to each of the plurality of flow channels to contact the reforming catalyst including N-hydroxyphthalimide.

20 Claims, 9 Drawing Sheets

(51) Int. Cl.
- *B01J 35/56* (2024.01)
- *B01J 35/66* (2024.01)
- *C10G 61/02* (2006.01)
- *C10L 1/04* (2006.01)
- *F02M 27/02* (2006.01)
- *F02M 31/12* (2006.01)
- *F02M 31/16* (2006.01)

(52) U.S. Cl.
CPC ............... *C10G 61/02* (2013.01); *C10L 1/04* (2013.01); *F02M 27/02* (2013.01); *F02M 31/12* (2013.01); *F02M 31/16* (2013.01); C10G 2300/307 (2013.01); C10G 2300/4068 (2013.01); C10G 2300/80 (2013.01); C10G 2400/02 (2013.01); C10L 2200/0423 (2013.01); C10L 2270/02 (2013.01); C10L 2290/06 (2013.01); C10L 2290/24 (2013.01)

(58) Field of Classification Search
CPC ... C10G 2400/02; B01J 31/0271; B01J 35/04; B01J 35/108; C10L 1/04; C10L 2200/0423; C10L 2270/02; C10L 2290/06; C10L 2290/24; F02M 27/02; F02M 31/12; F02M 31/16
See application file for complete search history.

(56) References Cited

U.S. PATENT DOCUMENTS

| | | | |
|---|---|---|---|
| 9,835,117 | B2 | 12/2017 | Hashimoto |
| 11,028,805 | B2 | 6/2021 | Hamad et al. |
| 2016/0333286 | A1 | 11/2016 | Kudo et al. |
| 2019/0170046 | A1* | 6/2019 | Hamad ............... F01N 3/36 |
| 2022/0235729 | A1 | 7/2022 | Hashimoto et al. |

OTHER PUBLICATIONS

Roy et al., "Monoliths as Multiphase Reactors: A Review", Reactors, Kinetics, and Catalysis, AIChE Journal, vol. 50, No. 11, pp. 2918-2938, Nov. 2004.

Tan et al., "Conjugated copper(II) porphyrin polymer and N-hydroxyphthalimide as effective catalysts for selective oxidation of cyclohexylbenzene", Catalysis Communications, vol. 94, pp. 60-64, 2017.

Toribio et al., "Ethylbenzene oxidation to its hydroperoxide in the presence of N-hydroxyimides and minute amounts of sodium hydroxide", Applied Catalysts A: General, vol. 363, pp. 32-39, 2009.

Notification of Transmittal of the International Search Report and the Written Opinion of the International Searching Authority, or the Declaration dated Apr. 8, 2024 pertaining to International application No. PCT/US2023/083818 filed Dec. 13, 2023, pp. 1-12.

\* cited by examiner

SYSTEMS AND PROCESSES FOR REFORMING A LIQUID HYDROCARBON FUEL

BACKGROUND

Field

The present disclosure relates to systems and methods for reforming liquid hydrocarbon fuel, more specifically, to the aerobic oxidation of liquid hydrocarbon fuel using a catalyst to produce a reformed liquid hydrocarbon fuel with a high cetane number.

Technical Background

Hydrocarbon fuels may be upgraded through the use of catalysts to produce hydrocarbon fuel with a high cetane number. However, the worldwide increasing demand for upgraded hydrocarbon fuel remains a challenge. Typical methods for reforming hydrocarbon fuel involve a batch mode reactor with a solid particulate catalyst, fuel in liquid phase, and oxygen in gas phase. Such batch mode reactor methods require long reaction times, high temperatures, and constant monitoring. These batch mode reactors also require separation of the solid particulate catalyst from the reaction mixture.

SUMMARY

Accordingly, there is an ongoing need for systems and methods for reforming liquid hydrocarbon fuel in a continuous mode reactor to produce reformed liquid hydrocarbon fuel with a high cetane number. Additionally, there may be a need for providing a stationary catalyst in the continuous mode reactor, while maintaining a strong interaction between the catalyst, liquid hydrocarbon fuel, and an oxygen-containing gas.

According to embodiments of the present disclosure, a system for reforming a liquid hydrocarbon fuel can include a mixing zone that includes a fuel intake fluidly coupled to a liquid hydrocarbon fuel source and an oxygen-containing gas intake fluidly coupled to an oxygen-containing gas source. The mixing zone can further include at least one atomizing nozzle and a fuel distribution zone downstream the at least one atomizing nozzle. The fuel intake and oxygen-containing gas intake may be in fluid communication with an inlet of the at least one atomizing nozzle, the fuel distribution zone may be in fluid communication with an outlet of the at least one atomizing nozzle. The system may also include a catalyst reaction zone downstream of the mixing zone, the catalyst reaction zone comprising a monolith block having a plurality of flow channels defined by monolith walls and a reforming catalyst coated onto the monolith walls in the plurality of flow channels. The at least one atomizing nozzle may generate a plurality of droplets comprising the liquid hydrocarbon fuel, where the droplets are suspended in the oxygen-containing gas. The fuel distribution zone may distribute the plurality of droplets and the oxygen-containing gas to each of the plurality of flow channels. The reforming catalyst may comprise N-hydroxyphthalimide (NHPI). The catalyst reaction zone may be configured to contact the plurality of droplets with the oxygen-containing gas in the presence of the reforming catalyst in each of the plurality of flow channels.

In embodiments of the present disclosure, a process for reforming liquid hydrocarbon fuel may include passing a liquid hydrocarbon fuel and an oxygen-containing gas to at least one atomizing nozzle to produce a plurality of droplets comprising the liquid hydrocarbon fuel that are suspended in the oxygen-containing gas. The process may further include passing the plurality of droplets and the oxygen-containing gas to a fuel distribution zone. The process may further include distributing the plurality of droplets and the oxygen-containing gas to a plurality of flow channels in a monolith block, and contacting the plurality of droplets comprising the liquid hydrocarbon fuel with the oxygen-containing gas in the presence of a reforming catalyst. The reforming catalyst may comprise NHPI. Contacting the plurality of droplets with the oxygen-containing gas in the presence of the reforming catalyst may cause at least a portion of the liquid hydrocarbon fuel to undergo one or more chemical reactions to produce a reformed liquid hydrocarbon fuel. The reformed liquid hydrocarbon fuel may have a cetane number greater than a cetane number of the liquid hydrocarbon fuel.

In embodiments of the present disclosure, a method for reforming liquid hydrocarbon fuel may include introducing a liquid hydrocarbon fuel and an oxygen-containing gas to a mixing zone through a fuel intake and an oxygen-containing gas intake, respectively. The method may further include mixing the liquid hydrocarbon fuel and the oxygen-containing gas in a mixing zone. The mixing zone may have at least one atomizing nozzle. The at least one atomizing nozzle may be used in producing a plurality of droplets to a distribution zone. The plurality of droplets may comprise the liquid hydrocarbon fuel suspended in the oxygen-containing gas. The method may further include the distribution zone distributing the plurality of droplets to a catalyst reaction zone comprising a monolith block having a plurality of flow channels defined by monolith walls and a reforming catalyst, which may comprise NHPI, coated onto the monolith walls in the plurality of flow channels. The method may further include contacting the plurality of droplets with the oxygen-containing gas in the presence of the reforming catalyst in each of the plurality of flow channels.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, in which like structure may be indicated with like reference numerals and in which.

DETAILED DESCRIPTION

Figure 1:
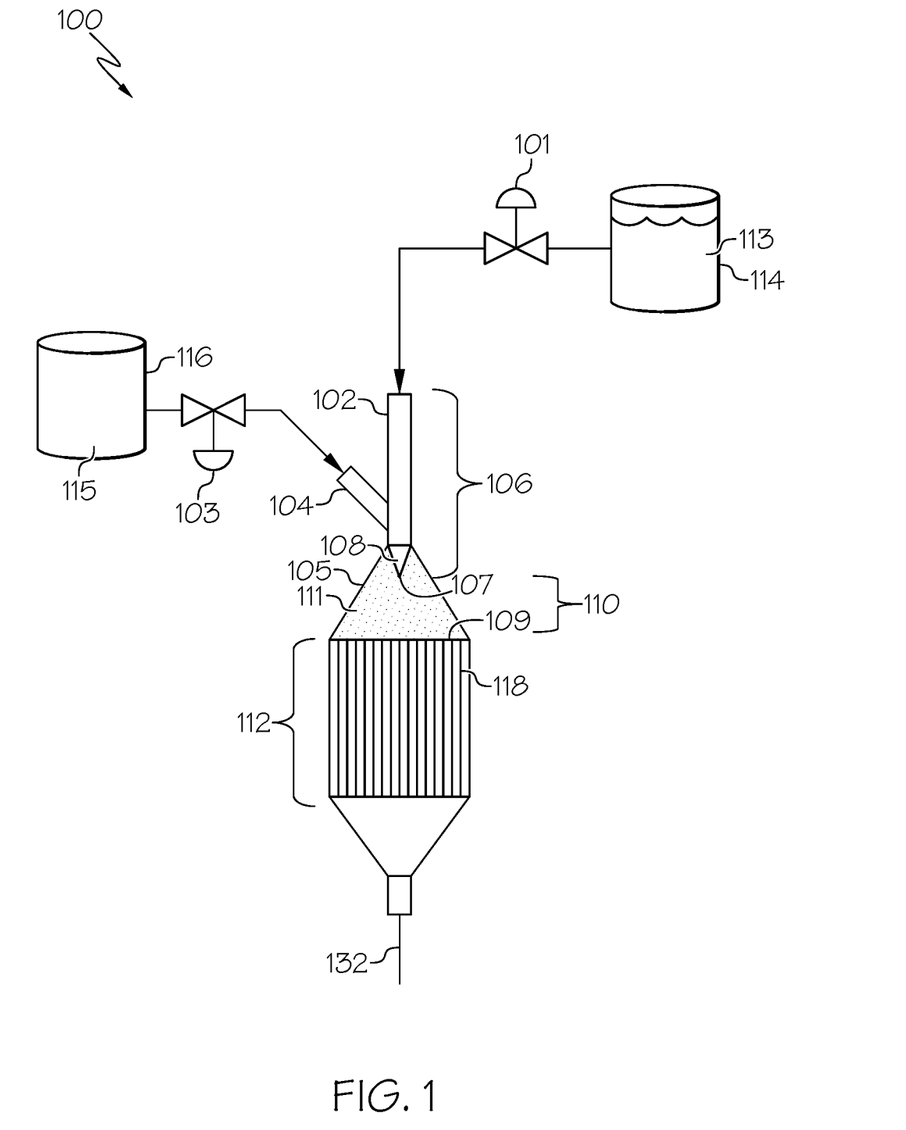
FIG. 1 schematically depicts a system for reforming a liquid hydrocarbon fuel, according to embodiments shown and described in the present disclosure.

Embodiments of the present disclosure are described in the detailed description, which follows. The present disclosure may be directed to systems and processes for reforming liquid hydrocarbon fuel to produce reformed liquid hydrocarbon fuel having a greater cetane number compared to the liquid hydrocarbon fuel before reforming. Referring now to FIG. 1, one embodiment of a system 100 of the present disclosure for reforming a liquid hydrocarbon fuel 113 may include a mixing zone 106 comprising a fuel intake 102 fluidly coupled to a liquid hydrocarbon fuel source 114 containing the liquid hydrocarbon fuel 113, an oxygen-containing gas intake 104 fluidly coupled to an oxygen-containing gas source 116 containing an oxygen-containing gas 115, at least one atomizing nozzle 108, and a fuel distribution zone 110 downstream of the at least on atomizing nozzle 108. The system 100 may further include a catalyst reaction zone 112 downstream of the mixing zone 110. The catalyst reaction zone 112 may comprise a monolith block 118 having a plurality of flow channels defined by monolith walls and a reforming catalyst coated onto the monolith walls in the plurality of flow channels. An inlet of the at least one atomizing nozzle 108 may be in fluid communication with the oxygen-containing gas intake 104 and fuel intake 102. An outlet of the at least one atomizing nozzle 108 may be in fluid communication with the fuel distribution zone 110. The at least one atomizing nozzle 108 may generate a plurality of droplets 111 suspended in the oxygen-containing gas 115, each of the plurality of droplets 111 comprising the liquid hydrocarbon fuel 113. The fuel distribution zone 110 may be configured to distribute the plurality of droplets 111 and the oxygen-containing gas 115 to each of the plurality of flow channels 119, which comprises the reforming catalyst 121, which may be N-hydroxyphthalimide (NHPI). The droplets 111 of the liquid hydrocarbon fuel 113 may be contacted with the oxygen-containing gas 115 in the presence of the reforming catalyst 121 in the flow channels 119. The contacting may cause at least a portion of the liquid hydrocarbon fuel 113 to undergo one or more chemical reactions to produce a reformed liquid hydrocarbon fuel. The system may be used in a method for reforming the liquid hydrocarbon fuel 102 to produce a reformed liquid hydrocarbon fuel having a cetane number greater than the liquid hydrocarbon fuel 102.

As used throughout the present disclosure, "cetane number" refers to the derived cetane number (DCN) of gasoline fuel (liquid hydrocarbon) which is calculated using the ignition delay (ms) measured by an ignition quality tester (IQT) analyzer according to the standard test method in ASTM D6890-21.

As used throughout the present disclosure, "atomizing nozzle" refers to a nozzle that may be capable of combining liquid and gas to form a fine spray or mist.

As used throughout the present disclosure, "Taylor flow" refers to a type of flow axially through a microchannel, where the flow comprises a train of alternating liquid slugs and gas bubbles moving consecutively, one-by-one through the microchannel.

As used throughout the present disclosure, "Annular flow" refers to a type of flow axially through a microchannel, where the flow comprises a film of liquid on the walls of the microchannel.

As used throughout the present disclosure, "Churn flow" refers to a type of flow axially through a microchannel, where the flow comprises liquid regions and gas regions moving turbulently through the microchannel.

As used throughout the present disclosure, the terms "upstream" and "downstream" refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

Spark ignition engines are internal combustion engines that utilize a spark plug to ignite a combination of fuel and air. In contrast, compression ignition engines work by igniting liquid hydrocarbon fuel with compressed hot air, eliminating the need for a spark plug. Spark ignition engines have low efficiency and low power output when compared to compression ignition engines; compression ignition engines produce more power due to a high compression ratio. However, compression ignition engines are sometimes difficult to operate in low-temperature cold starts. During low temperature, cold start, a compression ignition engines may fail to burn all of the liquid hydrocarbon fuel, resulting in increased contaminant emissions, lower efficiency, and lower power output. Thus, there is an ongoing need for liquid hydrocarbon fuels with greater cetane number that are capable of burning fully in low temperature conditions in compression ignition engines during cold start.

The burning of liquid hydrocarbon fuel with a low cetane number in compression ignition engines can result in increased emissions, low efficiency, and low power output. This may be due to longer ignition delays and, thus, less time for the combustion process to be completed when the liquid hydrocarbon fuel with a low cetane number is utilized by a compression ignition engine. On the other hand, use of liquid hydrocarbon fuel having high cetane number can provide shorter ignition delays, resulting in a more complete burning of the liquid hydrocarbon fuel with a high cetane number in the compression ignition engine compared to the liquid hydrocarbon fuel with lower cetane number.

Methods have been developed to increase the cetane number of liquid hydrocarbon fuels. These conventional methods for reforming liquid hydrocarbon fuel involve using a batch reactor with a catalyst in solid phase, fuel in liquid phase, and oxygen in gas phase. However, such batch reactor systems demand high temperatures, long reaction times, and constant monitoring, which makes these systems less practical for on-board fuel reforming.

Figure 3:
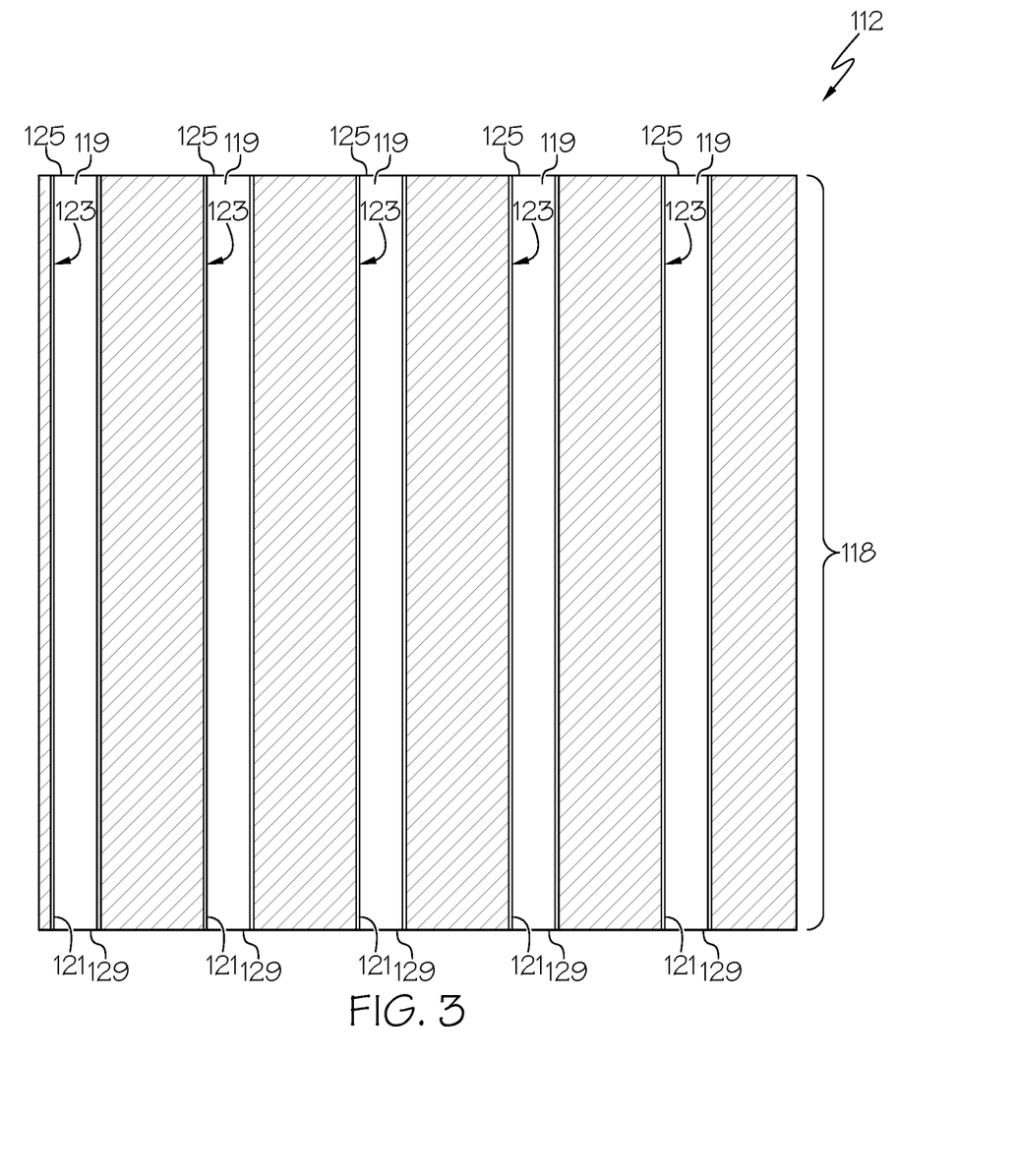
FIG. 3 schematically depicts a front cross-sectional view of a portion of a monolith block of the system of FIG. 1 and a plurality of flow channels within the monolith block, according to embodiments shown and described in the present disclosure.
Figure 4:
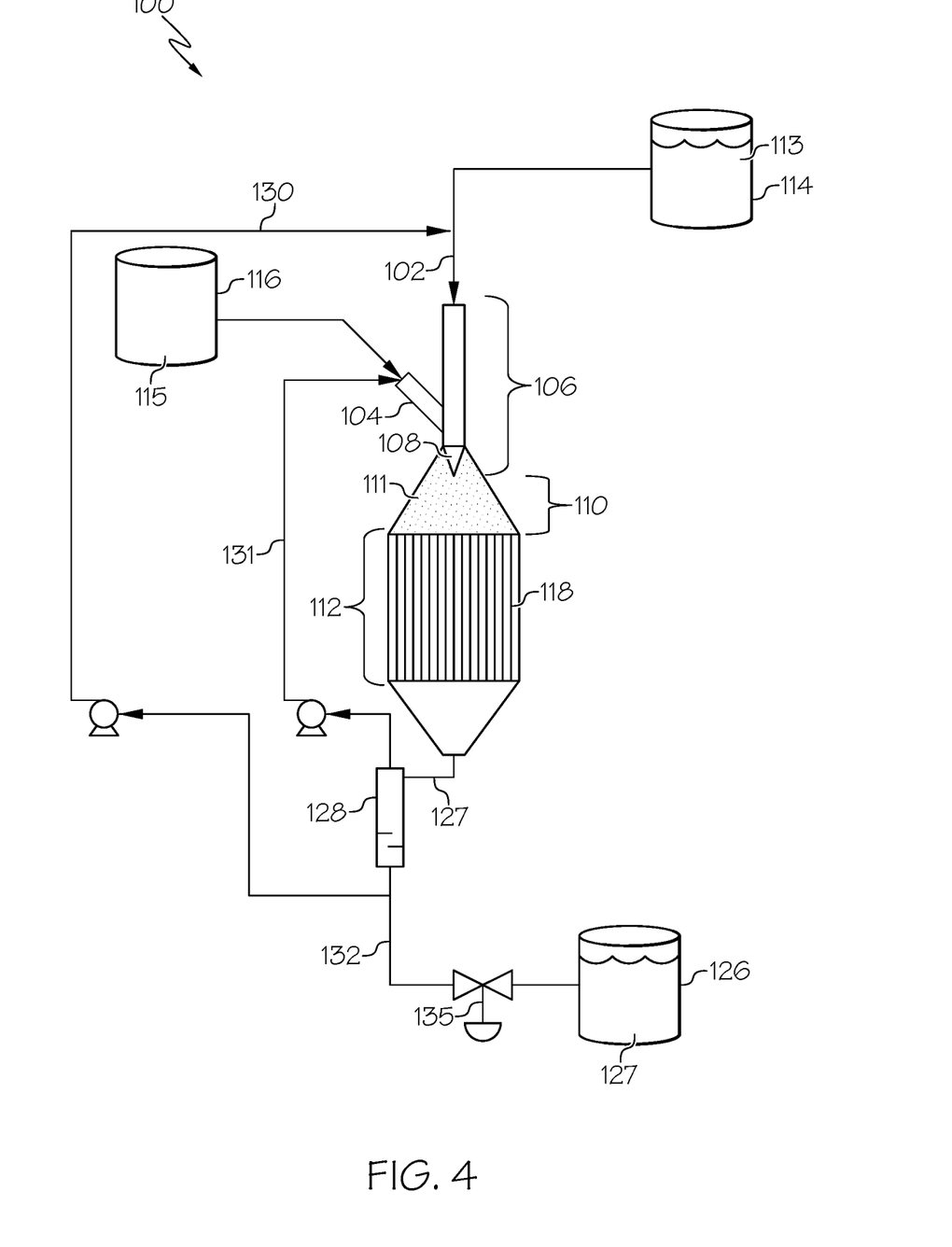
FIG. 4 schematically depicts a system for reforming a liquid hydrocarbon fuel including a fuel separator, a recycle line, a fuel product outlet line, and a reformed fuel vessel, according to embodiments shown and described in the present disclosure.
Figure 6:
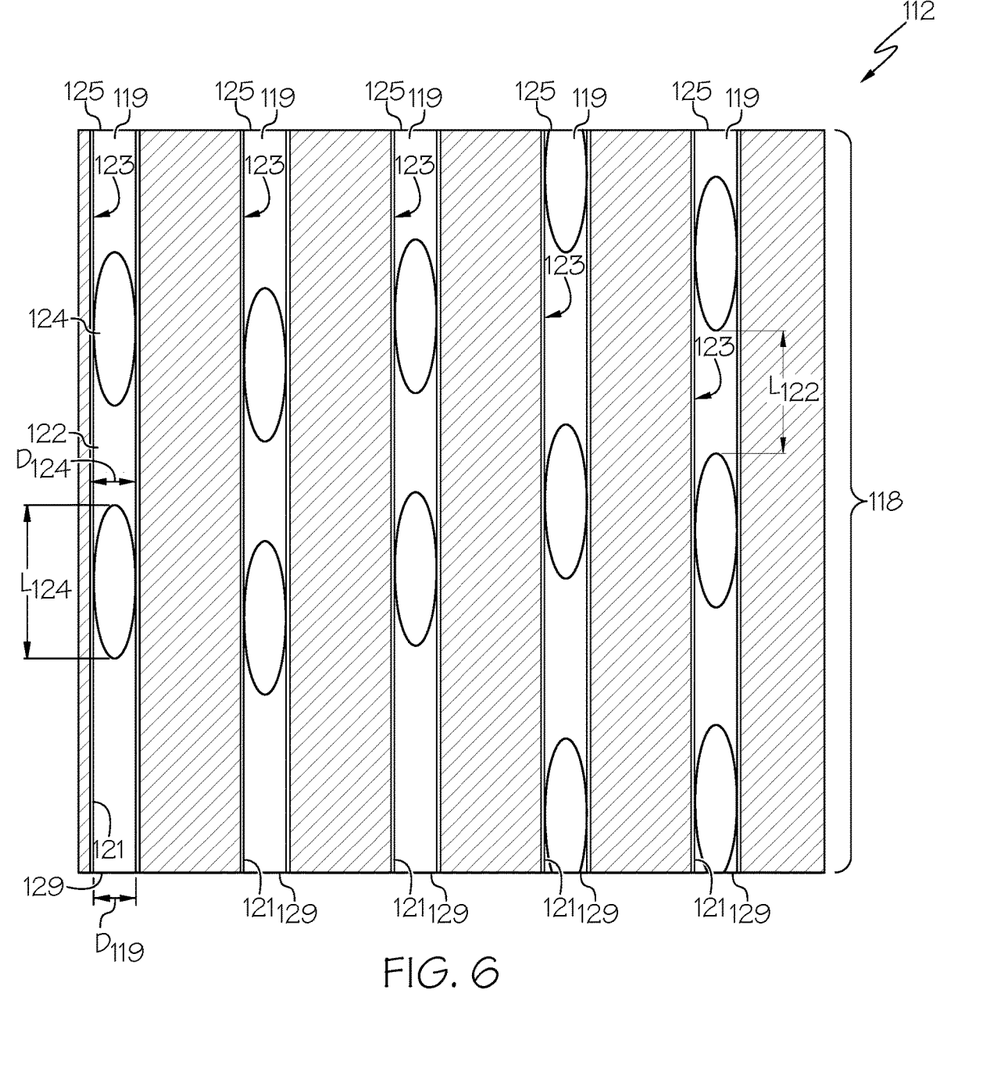
FIG. 6 schematically depicts a front cross-sectional view of the monolith block of FIG. 3 with a plurality of droplets passing through the plurality of flow channels, according to embodiments shown and described in the present disclosure.

The present disclosure solves these problems by providing systems that include a continuous flow reactor for reforming hydrocarbon fuel. Referring again to FIG. 1, the systems 100 comprise the mixing zone 106 and the catalyst reaction zone 112 downstream of the mixing zone 106. The mixing zone 106 comprises the at least one atomizing nozzle 108 operable to produce the plurality of droplets 111 suspended in the oxygen-containing gas 115, the droplets 111 comprising the liquid hydrocarbon fuel 113. Referring to FIG. 3, the catalyst reaction zone 112 comprises the monolith block 118 having the plurality of flow channels 119 defined by the monolith walls 117 and the reforming catalyst 121, such as N-hydroxyphthalimide (NHPI), coated onto the monolith walls 117. Referring again to FIG. 1, the liquid hydrocarbon fuel 113 and oxygen-containing gas 115 may be atomized by the at least one atomizing nozzle 108 to produce the plurality of droplets 111, which may then be passed through the plurality of flow channels 119 of the monolith block 118. Referring now to FIG. 6, in the plurality of flow channels 119, the liquid hydrocarbon fuel from the plurality of droplets contact the oxygen-containing gas 115 and the reforming catalyst 121 coated onto the surfaces 123 of the monolith walls 117. The catalyst 121 may be stationary, eliminating the need to separate the solid catalyst from a reformed liquid hydrocarbon fuel 127 (FIG. 4). The contacting causes at least some of the liquid hydrocarbon fuel 113 to react to produce the reformed liquid hydrocarbon fuel 127.

The systems of the present disclosure may allow for continuous reforming of liquid hydrocarbon fuels to produced reformed liquid hydrocarbon fuels. The systems of the present disclosure may also be useful as on-board fuel reforming systems to produce reformed liquid hydrocarbon fuels for engines, such as gasoline compression ignition engines or other types of engines.

Referring again to FIG. 1, the systems 100 of the present disclosure for reforming liquid hydrocarbon fuel may include the mixing zone 106 comprising the fuel intake 102, the oxygen-containing gas intake 104, one or more of the atomizing nozzles 108, and the fuel distribution zone 110. The atomizing nozzle 108 may be in fluid communication with the fuel intake 102 and oxygen-containing gas intake 104. The fuel distribution zone 110 may be disposed downstream from the atomizing nozzle 108. The system 100 may further include a catalyst reaction zone 112 disposed downstream of the mixing zone 106, such as downstream of the fuel distribution zone 110.

The mixing zone 106 may be upstream of the catalyst reaction zone 112 and may comprise the fuel intake 102, the oxygen-containing gas intake 104, the at least one atomizing nozzle 108, and the fuel distribution zone 110. The fuel intake 102 may be disposed upstream the atomizing nozzle 108. The fuel intake 102 may be fluidly coupled to a liquid hydrocarbon fuel source 114, which may enable the liquid hydrocarbon fuel 113 to be passed from the liquid hydrocarbon fuel source 114 to the fuel intake 102. The liquid hydrocarbon fuel 113 may be passed to the fuel intake 102 through use of a fuel pump or through hydrostatic pressure resulting from gravity by positioning the liquid hydrocarbon fuel source 114 vertically above the fuel intake 102. The liquid hydrocarbon fuel source 114 may be any vessel suitable for the storage of the liquid hydrocarbon fuel 113. The liquid hydrocarbon fuel 113 may be gasoline, diesel fuel, or any other suitable liquid hydrocarbon fuel capable of being oxidized to increase the cetane value. The fuel intake 102 may be fluidly coupled to the atomizing nozzle 108. The fuel intake 102 may be configured to pass the liquid hydrocarbon fuel 113 from the liquid hydrocarbon fuel source 114 to the atomizing nozzle 108. The fuel intake 102 may further comprise a fuel control valve 101 configured to control the flow rate of liquid hydrocarbon fuel 113 to the atomizing nozzle 108.

The oxygen-containing gas intake 104 may be upstream the atomizing nozzle 108. The oxygen-containing gas intake 104 may be fluidly coupled to an oxygen-containing gas source 116, which enables the oxygen-containing gas 115 to be passed from the oxygen-containing gas source 116 to the oxygen-containing gas intake 104. The oxygen-containing gas intake 104 may be fluidly coupled to the atomizing nozzle 108. The oxygen-containing gas intake 104 may be operable to pass the oxygen-containing gas 115 from the oxygen-containing gas source 116 to the atomizing nozzle 108. The oxygen-containing gas source 116 may be a vessel containing pressurized gas. The oxygen-containing gas source 116 may also be air from the atmosphere. In embodiments, the oxygen-containing gas source 116 may be an air compressor configured to provide air from the atmosphere at increased pressure. The oxygen-containing gas 115 may be air, oxygen, pressurized oxygen-containing gas, or any other suitable oxygen-containing gas, or combinations of oxygen-containing gases. The oxygen-containing gas 115 may have an oxygen content from 15 percent oxygen by volume to 100 percent oxygen by volume. The oxygen-containing gas intake 104 may further comprise a gas control valve 103 configured to control the flow rate of oxygen-containing gas 115 to the atomizing nozzle 108.

Figure 2:
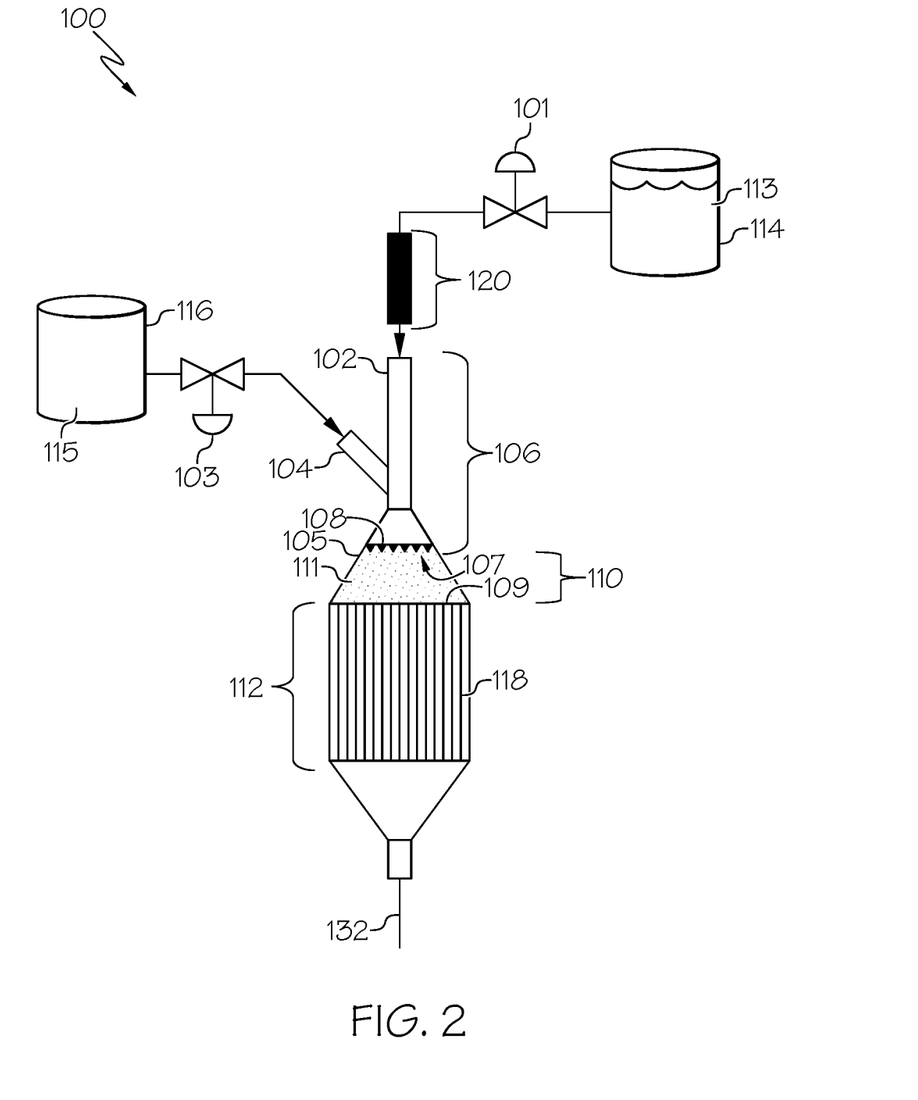
FIG. 2 schematically depicts a system for reforming a liquid hydrocarbon fuel including a plurality of atomizing nozzles, according to embodiments shown and described in the present disclosure.

The atomizing nozzle 108 may be provided downstream from and in fluid communication with the fuel intake 102 and the oxygen-containing gas intake 104. The mixing zone 106 may comprise one or a plurality of the atomizing nozzles 108, such as 1, 2, 3, 4, 5, 6, or more than 6 atomizing nozzles 108. Referring again to FIG. 1, in embodiments, the mixing zone 106 may comprise a single atomizing nozzle 108. Referring now to FIG. 2, in embodiments, the mixing zone 106 may include a plurality of atomizing nozzles 108, which may be arranged in parallel. The number of atomizing nozzles 108 may depend on the cross-sectional area of the monolith block 118 of the catalyst reaction zone 112. For instance, as the cross-sectional surface area of the monolith block 118 increases, the number of atomizing nozzles 108 needed to distribute the atomized flow over the cross-sectional area of the monolith block 118 may also increase. The atomizing nozzle 108 may produce a spray pattern that may be flat, fan-shaped, or conical.

The atomizing nozzle 108 may be any atomizing nozzle that may be capable of atomizing the liquid hydrocarbon fuel 113 by combining it with the oxygen-containing gas 115 to form a spray or mist. The spray or mist produced by the atomizing nozzle 108 may comprise the plurality of droplets 111. The plurality of droplets 111 are made up of the liquid hydrocarbon fuel 113 and the droplets 111 may be suspended in the oxygen-containing gas 115. The oxygen-containing gas 115 may be passed to the atomizing nozzles 108 at a gas flow rate, and the liquid hydrocarbon fuel 113 may be passed to the atomizing nozzles 108 at a liquid flow rate. In embodiments, the liquid flow rate may be different from the gas flow rate. The liquid hydrocarbon fuel 113 may be passed through the atomizing nozzle 108 at a liquid flow rate range from 0.1 gallons per hour (378 cubic centimeters per hour) to 18 gallons per hour (68,137 cubic centimeters per hour), or any other suitable range of flow rates. The oxygen-containing gas 115 may be passed through the atomizing nozzle 108 at a gas flow rate range of 0.1 standard cubic feet per minute (2,800 cubic centimeters per minute) to 25 standard cubic feet per minute (707,000 cubic centimeters per minute), or any other suitable range of flow rates. The liquid flow rate and the gas flow rate may be controlled to produce the desired spray pattern and the desired flow conditions in the distribution zone 110.

Referring again to FIG. 2, the system 100 may further include a fuel preheating zone 120. The fuel preheating zone 120 may be a conduit upstream from the fuel intake 102. The liquid hydrocarbon fuel 113 may be passed through the fuel preheating zone 120 upstream of the fuel intake 102. The fuel preheating zone 120 may comprise a heating device or heat exchanger thermally coupled to the conduit, where the heating device or heat exchanger is configured to actively heat the liquid hydrocarbon fuel 113 flowing through the fuel preheating zone 120. In embodiments, the heating device may be an electrical heating device powered by a battery or electrical generator. Alternatively or additionally, in embodiments, the fuel preheating zone 120 may comprise a heat exchanger configured to heat the liquid hydrocarbon fuel 113 through heat exchange with a heat transfer fluid passed through the heat exchanger. The heat transfer fluid may be an engine exhaust, heated engine coolant, or any other heated fluid from a vehicle. The liquid hydrocarbon fuel 113 passing through the fuel preheating zone 120 may be heated to a temperature of from 80 degrees Celsius to 130 degrees Celsius.

Referring to FIGS. 1 and 2, the fuel distribution zone 110 may be disposed downstream from the atomizing nozzle 108. The fuel distribution zone 110 may comprise a conduit wall 105 defining an internal volume. The fuel distribution zone 110 may have an inlet end 107 fluidly coupled to the atomizing nozzle 108 and an outlet end 109 fluidly coupled to the catalyst reaction zone 112. The fuel distribution zone 110 may be configured to distribute the plurality of droplets 111 produced by the atomizing nozzle 108 and the oxygen-containing gas 115 to the catalyst reaction zone 112. The conduit wall 105 of the fuel distribution zone 110 may be shaped to provide an expanding volume for distribution of the plurality of droplets 111 and the oxygen-containing gas 115 to the catalyst reaction zone 112. In embodiments, the conduit wall 105 of the fuel distribution zone 110 may have a frustoconical shape, where an inner diameter of the conduit wall 105 at the outlet end 109 may be larger than the inner diameter of the conduit wall 105 at the inlet end 107. A cross-sectional shape of the fuel distribution zone 110 taken perpendicular to an average direction of flow of the droplets 111 through the fuel distribution zone 110 may be any suitable shape, such as but not limited to square, rectangular, circular, oval, irregular shaped, or other suitable shape. The conduit wall 105 of the fuel distribution zone 110 may have any other shape suitable for distributing the plurality of droplets 111 and the oxygen-containing gas 115 from the atomizing nozzle 108 to the catalyst reaction zone 112.

The catalyst reaction zone 112 may be downstream from and in fluid communication with the fuel distribution zone 110. Referring now to FIG. 3, the catalyst reaction zone 112 may include the monolith block 118. The monolith block 118 may include a plurality of flow channels 119 extending axially through the monolith block 118. The plurality of flow channels 119 of the monolith block 118 may be arranged in a honeycomb, triangular, or any other suitable pattern. In embodiments, the monolith block 118 may include a plurality of flow channels 119 that are parallel and extend from an inlet side of the monolith block 118 (an inlet end 125 of the plurality of flow channels 119) to an outlet side of the monolith block 118 (an outlet end 129 of the plurality of flow channels 119).

The monolith block 118 may be constructed from various porous materials with high surface areas such as but not limited to metal foam, activated carbon, cordierite, a combination thereof, or any other suitable porous material. The monolith block 118 may also be constructed from various nonporous materials with low surface areas such as but not limited to metal, a combination thereof, or any other suitable nonporous material. In embodiments, the monolith block 118 may comprise cordierite and may be manufactured by extrusion and heating. In embodiments, the monolith block 118 may be constructed from metal may be manufactured by one or more metal bonding processes.

Referring again to FIG. 3, the plurality of flow channels 119 are defined by monolith wall surfaces 123 the plurality of monolith walls 117. The plurality of flow channels 119 may each have an inlet end 125 and an outlet end 129. The inlet ends 125 of the flow channels 119 may be fluidly coupled to the fuel distribution zone 110.

In embodiments, the porous monolith block 118 may be made of metal foam and may have a pore density sufficient to increase the surface area of the monolith walls 117. In embodiments, the monolith block 118 may be made of metal foam and may have a pore density of 10 pores per inch (3.94 pores per centimeter) to 60 pores per inch (23.62 pores per centimeter). In embodiments, the nonporous monolith block 118 may be made of cordierite or metal and may have a cell density of 100 cells per square inch (15.5 cells per square centimeter) to 1200 cells per square inch (186 cells per square centimeter). The pore density and cell density may have an effect on catalyst loading and back pressure. The channel density of the monolith block 118 may vary depending on the size of each of the plurality of flow channels 119 and the thickness of the monolith walls 117. In embodiments, the widest cross-sectional dimension (diameter for circular channels) of the plurality of channels 119 may be less than 5 millimeters (mm), such as from 0.1 mm to 5 mm. In embodiments, a length of the plurality of channels 119 may be from 1 centimeter to 1 meters.

The monolith wall surfaces 123 may be coated with a reforming catalyst 121. The reforming catalyst may include an N-hydroxyimide group-containing compound, namely N-hydroxyphthalimide (NHPI) or an NHPI derivative. The NHPI may be wash-coated onto or directly added to the monolith walls. The NHPI catalyzes the reaction between the oxygen-containing gas 115 and the liquid hydrocarbon fuel 113 from the plurality of droplets 111 to produce the reformed liquid hydrocarbon fuel 127 that has a greater cetane value compared to the liquid hydrocarbon fuel 113. A composite catalyst may be produced through the NHPI being added to a porous support before being coated onto the surfaces of the monolith walls. The porous support may be alumina, silica, zeolite, zirconia, metal carbide, amorphous silica-aluminate, active carbon, carbon-based materials, and inert 2D materials like boron nitride (BN). In embodiments, the porous support may be a zeolite support or a silicalite support having a silica to alumina molar ratio of from 80 to 1500.

The NHPI may be loaded onto the porous support by preparing a slurry containing NHPI and the porous support in a solvent, such as Acetonitrile ($CH_3CN$). The slurry may then be refluxed for 12 hours to disperse the NHPI throughout the support. The solvent may then be evaporated at 13 Kilopascal and 40 degrees Celsius. The powder may be further dried for 12 hours at 70 degrees Celsius. Alternatively, the porous support may be coated onto the monolith walls 117, and the NHPI may then be impregnated onto the porous support with the solvent by flowing the solvent-NHPI mixture through the channels 119.

Referring again to FIGS. 1 and 2, the system 100 may comprise a fuel product outlet line 132. The fuel product outlet line 132 may be fluidly coupled to the outlet ends 129 of the plurality of flow channels 119 through the monolith block 118. Referring now to FIG. 4, the fuel product outlet line 132 may also be fluidly coupled to a reformed fuel vessel 126. The fuel product outlet line 132 may pass a reformed liquid hydrocarbon fuel 127 from the catalyst reaction zone 112 to the reformed fuel vessel 126. The reformed fuel vessel 126 may store the reformed liquid hydrocarbon fuel 127 for use. The reformed fuel vessel 126 may be stationary or onboard a vehicle 200. The fuel product outlet line 132 may also comprise an outlet control valve 133. The outlet control valve 133 may be a gate valve, ball valve, or any other suitable type of control valve. The outlet control valve 133 may restrict flow of the reformed liquid hydrocarbon fuel 127 and, thus, increase pressure within the catalyst reaction zone 112.

The system 100 may oxidize the liquid hydrocarbon fuel 113 in the presence of the oxygen-containing gas 115 and the reforming catalyst 121, which may comprise the NHPI, to produce the reformed liquid hydrocarbon fuel 127. The liquid hydrocarbon fuel 113 may be drawn from the liquid hydrocarbon fuel source 114, while the oxygen-containing gas 115 may be drawn from the oxygen-containing gas source 116. The liquid hydrocarbon fuel 113 and oxygen-containing gas 115 may be atomized by the atomizing nozzle 108 to produce the plurality of droplets 111 of the liquid hydrocarbon fuel 113 suspended in the oxygen-containing gas 115. The plurality of droplets 111 and the oxygen-containing gas 115 may then be distributed to the plurality of flow channels 119, which are coated with the reforming catalyst 121. The reforming catalyst 121 may catalyze the oxidation reaction between the liquid hydrocarbon fuel 113 (in the plurality of droplets 111) and the oxygen-containing gas 115 to produce the reformed liquid hydrocarbon fuel 127.

Referring again to FIG. 4, the system 100 may comprise a fuel separator 128. The fuel separator 128 may be configured to separate the reformed liquid hydrocarbon fuel 127 from the oxygen-containing gas 115. In embodiments, at least a portion of the reformed liquid hydrocarbon fuel 127 that has been separated may be returned to the fuel intake 102 through a fuel recycle line 130. The oxygen-containing gas 115 that has been separated may then be returned to the oxygen-containing gas intake 104 through an oxygen-containing gas recycle line 131. In embodiments, at least a portion of or all of the reformed liquid hydrocarbon fuel 127 may be passed to the reformed fuel vessel 126 through a fuel product line 132.

Figure 5:
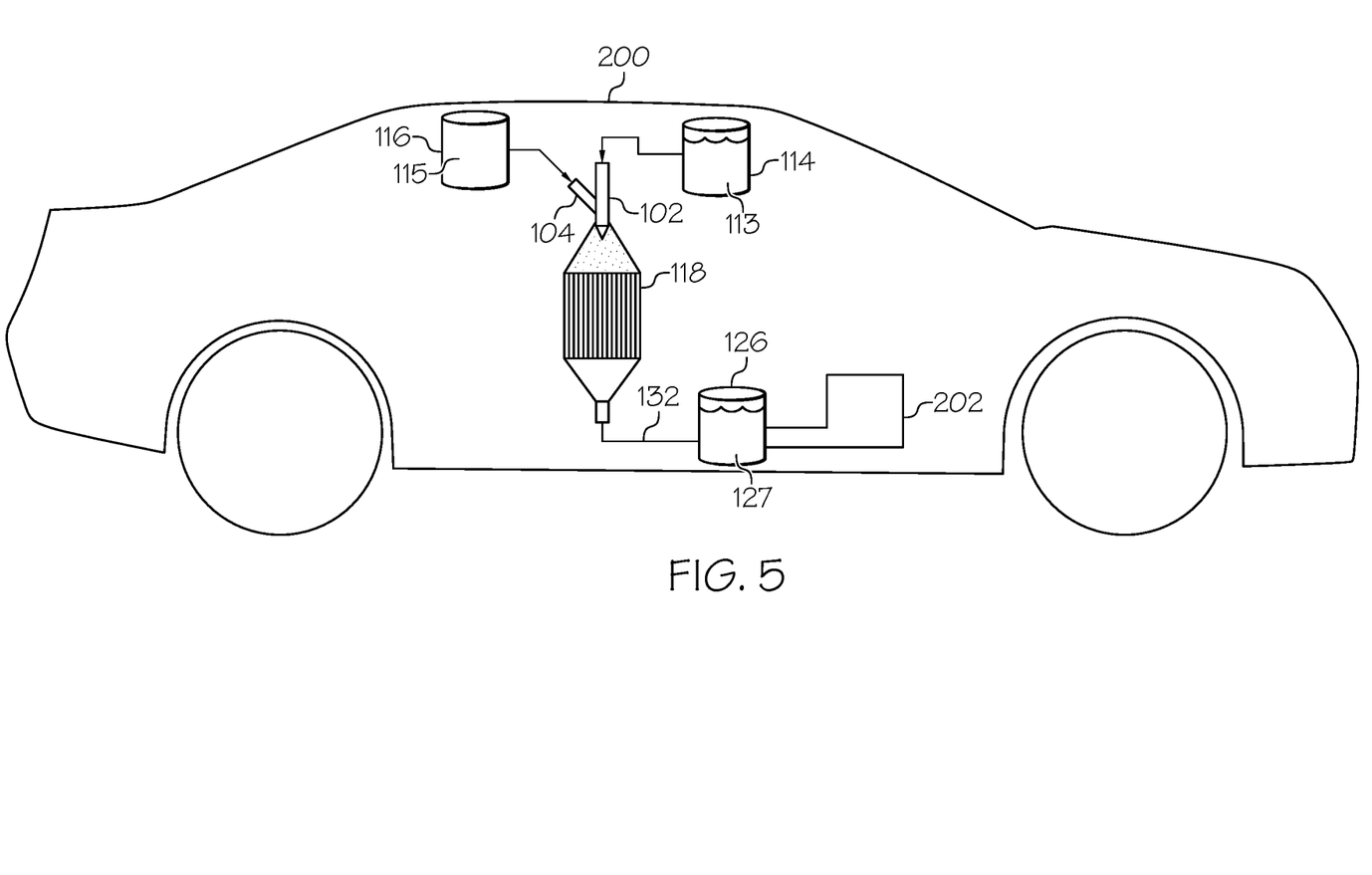
FIG. 5 schematically depicts a system for reforming a liquid hydrocarbon fuel onboard a vehicle with a gasoline compression engine, according to embodiments shown and described in the present disclosure.

The system 100 may be useful for onboard fuel reforming for vehicles, such as but not limited to vehicles comprising compression ignition engines. Referring now to FIG. 5, in embodiments, the system 100 for reforming liquid hydrocarbon fuel may be onboard the vehicle 200. The vehicle 200 may be any means of transport that comprises a gasoline compression engine 202. The gasoline compression engine 202 of the vehicle 200 may be fluidly coupled to the reformed fuel vessel 126. In embodiments, the gasoline compression engine 202 may utilize the reformed liquid hydrocarbon fuel 127 from the reformed fuel vessel 126, resulting in quicker ignition of the reformed liquid hydrocarbon fuel, improved efficiency, and fewer emissions.

Referring again to FIG. 1, a method for reforming a liquid hydrocarbon fuel using the system 100 of the present disclosure may include introducing the liquid hydrocarbon fuel 113 and the oxygen-containing gas 115 to the mixing zone 106 through the fuel intake 102 and oxygen-containing gas intake 104, respectively. The method may further include mixing the liquid hydrocarbon fuel 113 and oxygen-containing gas 115 in the mixing zone 106, producing the plurality of droplets 111 of the liquid hydrocarbon fuel 113 with the atomizing nozzle 108, distributing the plurality of droplets 111 and the oxygen-containing gas 115 to the catalyst reaction zone 112 in the fuel distribution zone 110, and contacting the liquid hydrocarbon fuel 113 from the plurality of droplets 111 with the oxygen-containing gas 115 in the presence of the reforming catalyst 121 (NHPI) in each of the plurality of flow channels 119.

The method may include passing the liquid hydrocarbon fuel 113 from the liquid hydrocarbon fuel source 114 to the mixing zone 106 through the fuel intake 102. In embodiments, passing the liquid hydrocarbon fuel 113 to the mixing zone 106 may comprise pumping the liquid hydrocarbon fuel 113 from the liquid hydrocarbon fuel source 114, through the fuel intake 102, to the mixing zone 106. In embodiments, passing the liquid hydrocarbon fuel 113 to the mixing zone 106 may comprise gravity feeding liquid hydrocarbon fuel 113 from the liquid hydrocarbon fuel source 114, through the fuel intake 102, to the mixing zone 106. The amount of liquid hydrocarbon fuel 113 introduced into the mixing zone 106 through the fuel intake 102 may be controlled by adjusting the flow rate on the fuel pump or by adjusting the aperture of the fuel flow control valve 101.

The method may include passing the oxygen-containing gas 115 from the oxygen-containing gas source 116 or from the atmosphere into the mixing zone 106. The oxygen-containing gas 115 may passed to the mixing zone 106 through the use of a gas pump or any other suitable means. The amount of the oxygen-containing gas introduced into the mixing zone 106 through the oxygen-containing gas intake 104 may be controlled by adjusting the flow rate on the gas pump or by adjusting the aperture of the gas flow control valve 103.

The method may further include preheating the liquid hydrocarbon fuel 113 in the fuel preheating zone 120 upstream of the fuel intake 102. The method may include passing the liquid hydrocarbon fuel 113 through the conduit of the fuel preheating zone 120. The method may further include heating the liquid hydrocarbon fuel 113 passing through the conduit with the heating device, heat exchanger, heat transfer fluid, or combinations of these methods.

The method may further include increasing the pressure in the catalyst reaction zone 112. The pressure may be increased by increasing the flow rate of liquid hydrocarbon fuel 113 introduced into the catalyst reaction zone 112 through the use of the fuel pump or the fuel flow control valve 101, increasing the flow rate of oxygen-containing gas 115 introduced to the catalyst reaction zone 112 through the use of the gas pump or the gas flow control valve 103, restricting the flow of the reformed liquid hydrocarbon fuel 127 coming out of the catalyst reaction zone through the use of the outlet control valve 133, or a combination of these techniques. In embodiments, the pressure in the catalyst reaction zone 112 may be from 1 atmosphere (101.3 kPa) to 10 atmospheres (1013 kPa).

Referring now to FIG. 6, the method may further include passing the liquid hydrocarbon fuel 113 and the oxygen-containing gas 115 into the at least one atomizing nozzle 108 at a pressure and temperature that results in the liquid hydrocarbon fuel 113 from the plurality of droplets 111 and the oxygen-containing gas 115 contacting each other at the monolith wall surfaces 123 of the monolith walls comprising the NHPI catalyst in the catalyst reaction zone 112. The flow rates, temperature, and pressure of the droplets 111 and oxygen-containing gas 115 may be sufficient to produce Taylor flow, annular flow, or churn flow of the liquid hydrocarbon fuel and oxygen-containing gas through the plurality of flow channels 119. In embodiments, the flow rates, temperature, and pressure of the droplets 111 and oxygen-containing gas 115 may be sufficient to produce a flow regime through the plurality of flow channels 119 in the form of vapor plugs 122 and liquid slugs 124, otherwise known as Taylor flow. Taylor flow may be characterized by an outer length $L_{124}$ of the liquid slugs being greater than or equal to two times an inner diameter $D_{119}$ of the plurality of flow channels 119. An outer diameter $D_{124}$ of the liquid slugs 124 may be from 95% to 100% of the inner diameter $D_{119}$ of the plurality of flow channels 119. Ends of the liquid slugs 124 may be separated by a length $L_{122}$ of the vapor plugs 122. The speed of the vapor plugs 122 and liquid slugs 124 may be controlled through adjusting the fuel flow control valve 101, the fuel pump, the gas flow control valve 103, the gas pump, the outlet control valve 133, or combinations of these methods.

In embodiments, the liquid hydrocarbon fuel 113 and the oxygen-containing gas 115 may also flow through the plurality of flow channels 119 as annular flow. In annular flow, the droplets 111 of liquid hydrocarbon fuel 113 may produce a film of the liquid hydrocarbon fuel 113 formed on the NHPI catalyst 121, creating a fuel-catalyst interface. In particular, contact of the droplets 111 of the liquid hydrocarbon fuel 113 with the monolith walls at the inlet end 125 of the plurality of flow channels 119 may cause the droplets to break, resulting in the liquid hydrocarbon fuel 113 forming the film on the monolith wall surfaces 123. The oxygen-containing gas 115 may then diffuse through the film of the liquid hydrocarbon fuel 113 to the fuel-catalyst interface, where the liquid hydrocarbon fuel 113 and the oxygen-containing gas 115 may come into contact in the presence of the NHPI catalyst 121 to accelerate reaction between the liquid hydrocarbon fuel 113 and the oxygen-containing gas 115. The film thickness may range from 20 microns to 80 microns. In embodiments, the droplets 111 and oxygen-containing gas 115 may pass through the plurality of flow channels 119 in churn flow or in any other type of flow regime that brings the liquid hydrocarbon fuel 113 and oxygen-containing gas 115 into contact with each other in the presence of the NHPI catalyst 121.

Contacting the liquid hydrocarbon fuel 113 from the plurality of droplets 111 with the oxygen-containing gas 115 in the presence of the NHPI catalyst 121 within the plurality of flow channels 119 may cause the liquid hydrocarbon fuel 113 to react with the oxygen-containing gas 115 and the NHPI catalyst 121 to produce the reformed liquid hydrocarbon fuel 127 having constituents with greater cetane value, such as but not limited to hydroperoxide. The oxygen-containing gas 115 may oxidize the liquid hydrocarbon fuel 113 and the reaction rate of oxidation may be increased through the use of the NHPI catalyst 121. After the liquid hydrocarbon fuel 113 has been oxidized, the method may further include passing the reformed liquid hydrocarbon fuel 127 to the reformed fuel vessel 126 and storing the reformed liquid hydrocarbon fuel 127 in the reformed fuel vessel 126.

Referring again to FIG. 4, the method may further include removing the oxygen-containing gas 115 from the reformed liquid hydrocarbon fuel 127 through the use of the fuel separator 128. The method may then include recycling a portion of the separated reformed liquid hydrocarbon fuel 127 to the fuel intake 102 through the fuel recycle line 130. The method may then include recycling the separated oxygen-containing gas 115 to the oxygen-containing gas intake through the oxygen-containing gas recycle line 131. The method may further include passing the remaining reformed liquid hydrocarbon fuel 127 the reformed fuel vessel 126 through a fuel product line 132.

EXAMPLES

The various embodiments of systems and methods for reforming a liquid hydrocarbon fuel will be further clarified by the following examples. The examples are illustrative in nature, and should not be understood to limit the subject matter of the present disclosure.

Example 1: Varying Operation Temperature in NHPI Reaction

Figure 7:
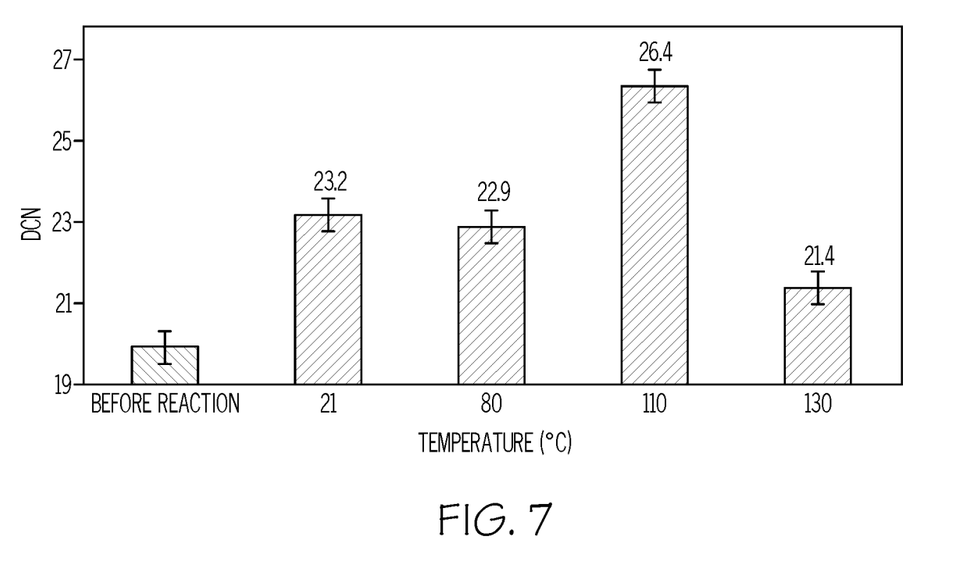
FIG. 7 is a chart showing the effect of temperature (x-axis) on a derived cetane number (y-axis) of a reformed liquid hydrocarbon fuel resulting from reacting a liquid hydrocarbon fuel with N-hydroxyphthalimide (NHPI) under batch conditions, according to embodiments shown and described in the present disclosure.

In Example 1, operation temperature for catalyzed oxidation of gasoline using NHPI catalyst was investigated. For Example 1, 100 milliliters of gasoline and air at a pressure of 300 kPa were reacted in the presence of 1 weight percent NHPI at a temperature that ranged from room temperature to 130 degrees Celsius for 3 hours. FIG. 7 graphically depicts the derived cetane number (DCN) (y-axis) for each of the reaction temperatures (x-axis). At 130 degrees Celsius, a decrease in the DCN was observed; this may be due to the auto catalytic oxidation of hydrocarbon at temperatures above 126 degrees Celsius.

Example 2: Comparing Activity of Unsupported NHPI to Supported NHPI

In Example 2, the performance of NHPI supported on a catalyst support was compared to the performance of unsupported NHPI for reforming gasoline. Example 2 was conducted in a batch reactor. 10 weight percent of NHPI was supported over different porous support materials: aluminum oxide, silicon dioxide nano powder, USY zeolite (silica to alumina molar ratio of 80) and silicalite (silica to alumina molar ratio of 1500). NHPI was deposited onto the support material by mixing NHPI and the porous support in a solvent, such as Acetonitrile ($CH_3CN$). The solvent was then evaporated and the powder dried for an additional 12 hours at 70 degrees Celsius.

Figure 8:
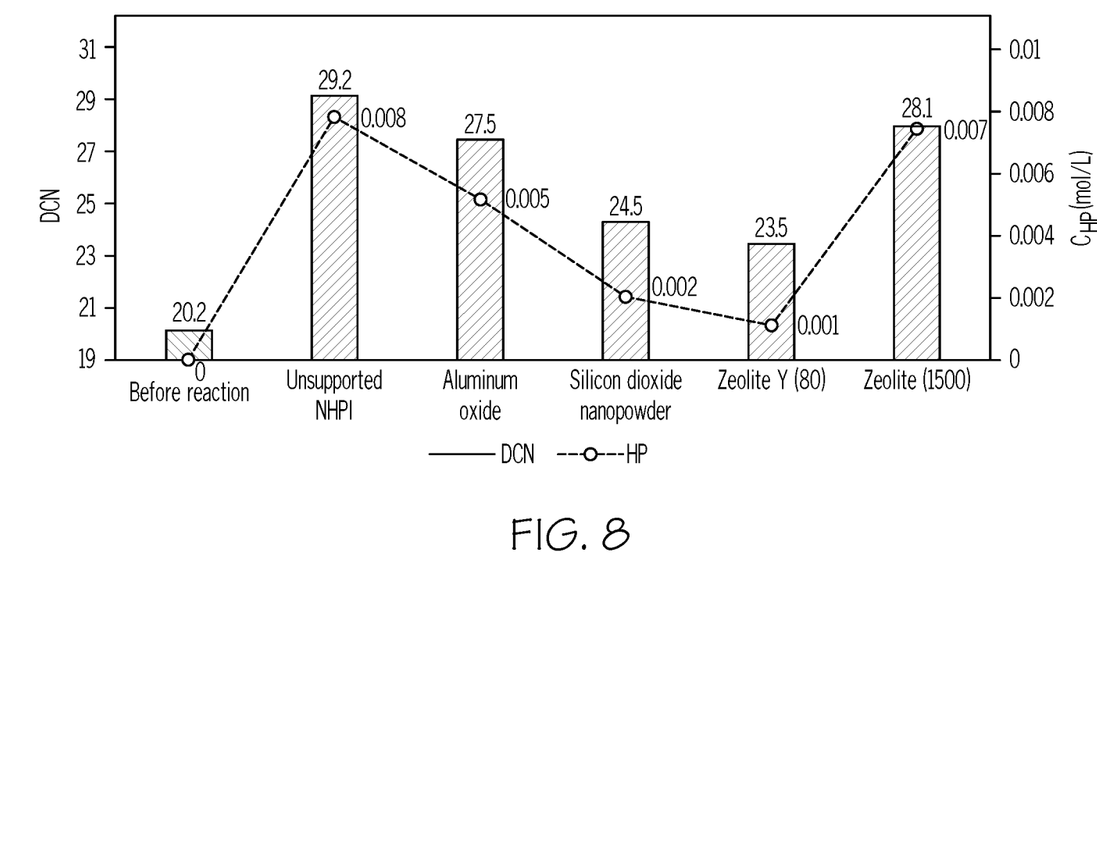
FIG. 8 is a chart showing a derived cetane number of a reformed liquid hydrocarbon fuel resulting from reaction of a liquid hydrocarbon fuel with NHPI catalyst supported on various catalyst supports, according to embodiments shown and described in the present disclosure.

The activity of the supported NHPI and unsupported NHPI powder was determined under batch conditions at a temperature of 110 degrees Celsius and a pressure of 1,000 Kilopascal. As FIG. 8 illustrates, unsupported NHPI had better activity, higher DCN, and greater hydroperoxide concentration ($CH_P$) compared to the supported NHPI. The DCN achieved through unsupported NHPI was 29.2, while the DCN achieved through NHPI supported on silicalite with silica to alumina molar ratio of 1500 was 28.1.

Example 3: Altering Oxygen Reaction Pressure

Figure 9:
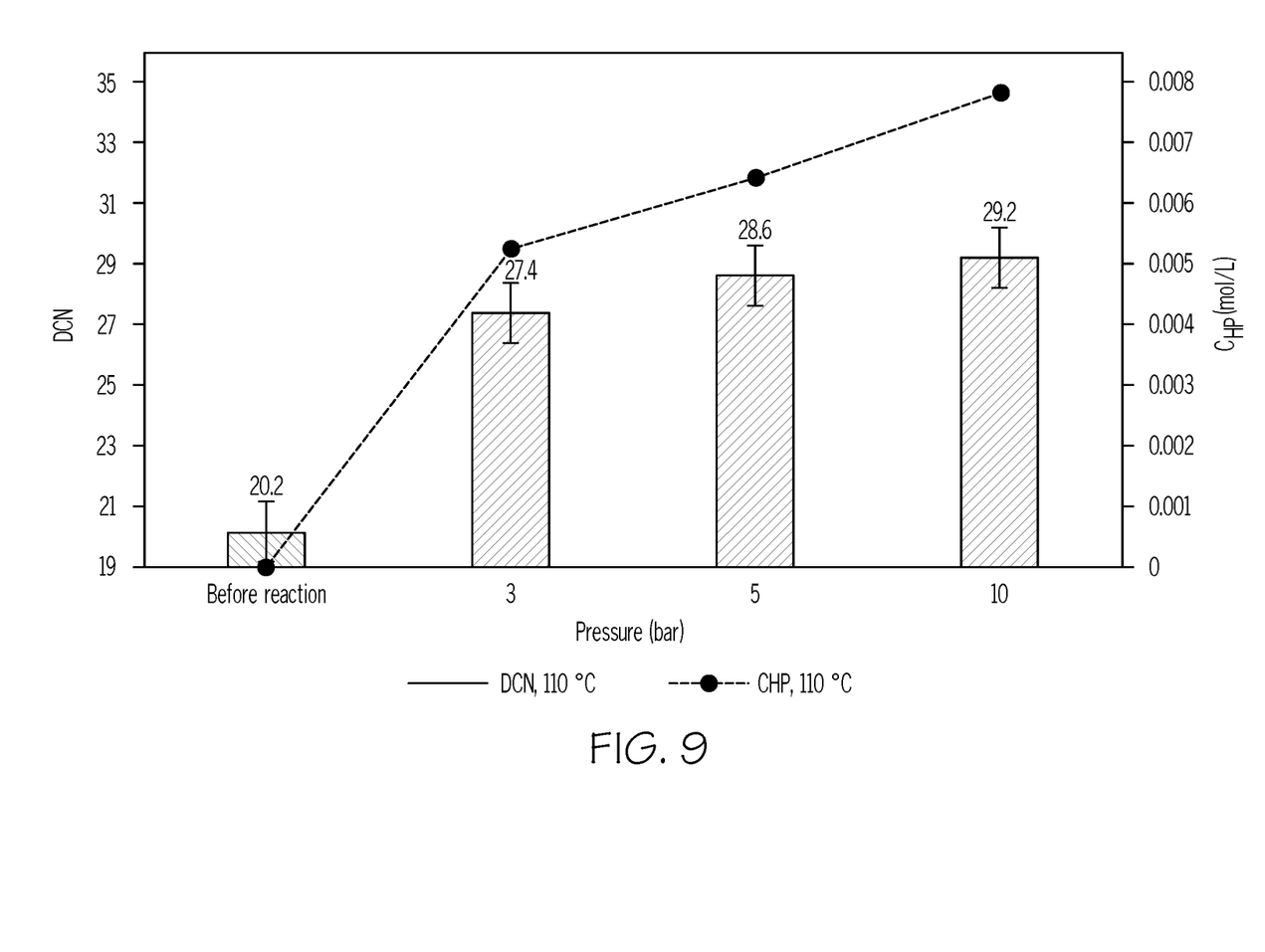
FIG. 9 schematically depicts a chart showing an effect of oxygen pressure (x-axis) on a derived cetane number (left y-axis) and concentration of hydrogen peroxide (right y-axis) of reformed liquid hydrocarbon fuel resulting from reaction of a liquid hydrocarbon fuel and NHPI, according to embodiments shown and described in the present disclosure.

Example 3 was conducted in batch reaction mode. 100 milliliters of gasoline and pure oxygen were reacted at a pressure varied from 300 kPa to 1,000 kPa at 110 degrees Celsius for 3 hours in the presence of 1 weight percent NHPI catalyst. FIG. 9 illustrates that the higher the oxygen reaction pressure, the higher the DCN and $C_{HP}$ concentration.

A first aspect of the present disclosure may be directed to a system for reforming a liquid hydrocarbon fuel that may include a mixing zone including a fuel intake fluidly coupled to a liquid hydrocarbon fuel source, an oxygen-containing gas intake fluidly coupled to an oxygen-containing gas source, at least one atomizing nozzle, and a fuel distribution zone downstream of the at least one atomizing nozzle. The system may also include a catalyst reaction zone downstream of the mixing zone, the catalyst reaction zone may include a monolith block having a plurality of flow channels defined by monolith walls and a reforming catalyst coated onto the monolith walls in the plurality of flow channels. The at least one atomizing nozzle may be in fluid communication with the oxygen-containing gas intake and the fuel intake, the fuel distribution zone may be in fluid communication with an outlet of the at least one atomizing nozzle, and the at least one atomizing nozzle may be configured to generate a plurality of droplets suspended in an oxygen-containing gas, the plurality of droplets including a liquid hydrocarbon fuel. The fuel distribution zone may be configured to distribute the plurality of droplets and the oxygen-containing gas to each of the plurality of flow channels, the reforming catalyst may include N-hydroxyphthalimide (NHPI), and the catalyst reaction zone may be configured to contact the plurality of droplets with the oxygen-containing gas in the presence of the reforming catalyst in each of the plurality of flow channels.

A second aspect of the present disclosure may include the first aspect, where the NHPI may be deposited onto a porous support to produce a composite catalyst and the composite catalyst may be coated onto the monolith walls.

A third aspect of the present disclosure may include the second aspect, where the porous support may be alumina, silica, zeolite, or a combination thereof.

A fourth aspect of the present disclosure may include any one of the first through third aspects, further comprising a fuel separator and a recycle line downstream of the fuel separator, where the recycle line may be in fluid communication with an outlet of the fuel separator and an inlet of the mixing zone.

A fifth aspect of the present disclosure may include any one of the first through fourth aspects, where the plurality of flow channels may be arranged in a honeycomb arrangement.

A sixth aspect of the present disclosure may include any one of the first through fifth aspects, where the fuel intake may include a fuel preheating zone configured to increase a temperature of the liquid hydrocarbon fuel.

A seventh aspect of the present disclosure may include any one of the first through sixth aspects, where the monolith walls may have a cell density of 100 cells per square inch to 1200 cells per square inch.

An eighth aspect of the present disclosure may include any one of the first through seventh aspects, where the monolith walls may have a pore density of 10 pores per inch to 60 pores per inch.

A ninth aspect of the present disclosure may include any one of the first through eighth aspects, further comprising a reformed fuel vessel downstream of the catalyst reaction zone.

A tenth aspect of the present disclosure may include the ninth aspect, further comprising a vehicle comprising a gasoline compression engine, where a gasoline inlet of the gasoline compression engine may be fluidly coupled to the reformed fuel vessel.

An eleventh aspect of the present disclosure may be directed to a process for reforming a liquid hydrocarbon fuel that may include passing a liquid hydrocarbon fuel and an oxygen-containing gas to at least one atomizing nozzle, where the at least one atomizing nozzle may produce a plurality of droplets suspended in the oxygen-containing gas, where each of the plurality of droplets may comprise the liquid hydrocarbon fuel. The process may further include passing the plurality of droplets suspended in the oxygen-containing gas from the atomizing nozzle to a fuel distribution zone, where the fuel distribution zone may distribute the plurality of droplets and the oxygen-containing gas to a plurality of flow channels in a monolith block. The process may further include contacting the plurality of droplets with the oxygen-containing gas in the presence of a reforming catalyst in the plurality of flow channels, where the reforming catalyst may comprise N-hydroxyphthalimide (NHPI) and contacting the plurality of droplets with the oxygen-containing gas in the presence of the reforming catalyst may cause at least a portion of the liquid hydrocarbon fuel to undergo one or more chemical reactions to produce a reformed liquid hydrocarbon fuel having a cetane number greater than a cetane number of the liquid hydrocarbon fuel.

A twelfth aspect of the present disclosure may include the eleventh aspect, further comprising passing the liquid hydrocarbon fuel and oxygen-containing gas into the atomizing nozzle at a pressure and temperature that may result in Taylor flow, annular flow, or churn flow of the liquid hydrocarbon fuel and the oxygen-containing gas through the plurality of flow channels.

A thirteenth aspect of the present disclosure may include the twelfth aspect, where the flow is Taylor flow comprising alternating liquid slugs and vapor plugs, where the liquid slugs may comprise the plurality of droplets and the vapor plugs may comprise the oxygen-containing gas.

A fourteenth aspect of the present disclosure may include the thirteenth aspect, where a diameter of the liquid slugs may be from 95 percent to 100 percent of an inner diameter of the plurality of flow channels and a length of the liquid slugs may be greater than or equal to the inner diameter of the plurality of flow channels.

A fifteenth aspect of the present disclosure may include any one of the eleventh through fourteenth aspects, where a thin film of liquid hydrocarbon fuel may exist on part of the plurality of flow channels.

A sixteenth aspect of the present disclosure may include any one of the eleventh through fifteenth aspects, further comprising heating the liquid hydrocarbon fuel to a temperature of at least 80 degrees Celsius in a fuel preheating zone within the fuel intake.

A seventeenth aspect of the present disclosure may include any one of the eleventh through sixteenth aspects, further comprising passing the liquid hydrocarbon fuel through the at least one atomizing nozzle at a liquid flow rate range of 300 cubic centimeters per hour to 69,000 cubic centimeters per hour.

An eighteenth aspect of the present disclosure may include any one of the eleventh through seventeenth aspects, further comprising passing the oxygen-containing gas through the at least one atomizing nozzle a gas flow rate range from 2,800 cubic centimeters per minute to 707,000 cubic centimeters per minute.

A nineteenth aspect of the present disclosure may include any one of the eleventh through eighteenth aspects, where the oxygen-containing gas may be air.

A twentieth aspect of the present disclosure may include any one of the eleventh through nineteenth aspects, where the liquid hydrocarbon fuel may be gasoline.

A twenty-first aspect of the present disclosure may include any one of the eleventh through twentieth aspects, further comprising separating unreacted liquid hydrocarbon fuel from the reformed liquid hydrocarbon fuel.

A twenty-second aspect of the present disclosure may the twenty-first aspect, further comprising recycling the unreacted liquid hydrocarbon fuel into a fuel intake and passing the reformed liquid hydrocarbon fuel through a fuel product outlet.

An twenty-third aspect of the present disclosure may be directed to a method for reforming liquid hydrocarbon fuel that may include introducing a liquid hydrocarbon fuel to a mixing zone through a fuel intake, introducing an oxygen-containing gas to the mixing zone through an oxygen-containing gas intake, and mixing the liquid hydrocarbon fuel and the oxygen-containing gas in the mixing zone comprising at least one atomizing nozzle. The method may further include producing a plurality of droplets to a fuel distribution zone downstream of the at least one atomizing nozzle, where the plurality of droplets may comprise the liquid hydrocarbon fuel suspended in the oxygen-containing gas, distributing the plurality of droplets to a catalyst reaction zone comprising a monolith block having a plurality of flow channels defined by monolith walls and a reforming catalyst coated onto the monolith walls in the plurality of flow channels, and contacting the plurality of droplets with the oxygen-containing gas in the presence of the reforming catalyst in each of the plurality of flow channels, where the reforming catalyst may comprise N-hydroxyphthalimide (NHPI).

A twenty-fourth aspect of the present disclosure may include the twenty-third aspect, further comprising separating unreacted liquid hydrocarbon fuel from reformed liquid hydrocarbon fuel.

A twenty-fifth aspect of the present disclosure may include the twenty-fourth aspect, further comprising recycling the unreacted liquid hydrocarbon fuel to the fuel intake and passing the reformed liquid hydrocarbon fuel through a fuel product outlet.

A twenty-sixth aspect of the present disclosure may any of the twenty-third through twenty-fifth aspects, further comprising preheating the liquid hydrocarbon fuel to increase a hydrocarbon fuel temperature in a fuel preheating zone.

A twenty-seventh aspect of the present disclosure may include the twenty-sixth aspect, where the liquid hydrocarbon fuel temperature may be between 80 degrees Celsius and 130 degrees Celsius.

A twenty-eighth aspect of the present disclosure may include any one of the twenty-third through twenty-seventh aspects, where the catalyst reaction zone has may have operation pressure from 100 Kilopascal to 1,100 Kilopascal.

It may be noted that one or more of the following claims utilize the terms "where," "wherein," or "in which" as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential components of the various embodiments described in this disclosure, even in cases where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A system for reforming a liquid hydrocarbon fuel, the system comprising:
   a mixing zone comprising:
      a fuel intake fluidly coupled to a liquid hydrocarbon fuel source;
      an oxygen-containing gas intake fluidly coupled to an oxygen-containing gas source;
      at least one atomizing nozzle; and
      a fuel distribution zone downstream of the at least one atomizing nozzle; and
   a catalyst reaction zone downstream of the mixing zone, the catalyst reaction zone comprising a monolith block having a plurality of flow channels defined by monolith walls and a reforming catalyst coated onto the monolith walls in the plurality of flow channels, where:
      the oxygen-containing gas intake and fuel intake are in fluid communication with an inlet of the at least one atomizing nozzle;
      the fuel distribution zone is in fluid communication with an outlet of the at least one atomizing nozzle;
      the at least one atomizing nozzle is configured to generate a plurality of droplets suspended in an oxygen-containing gas, the plurality of droplets comprising a liquid hydrocarbon fuel;
      the fuel distribution zone is configured to distribute the plurality of droplets and the oxygen-containing gas to each of the plurality of flow channels;
      the reforming catalyst comprises N-hydroxyphthalimide (NHPI); and
      the catalyst reaction zone is configured to contact the plurality of droplets with the oxygen-containing gas in the presence of the reforming catalyst in each of the plurality of flow channels.

2. The system of claim 1, where the NHPI is deposited onto a porous support to produce a composite catalyst and the composite catalyst is coated onto the monolith walls.

3. The system of claim 2, where the porous support is alumina, silica, zeolite, or a combination thereof.

4. The system of claim 1, further comprising a fuel separator and a recycle line downstream of the fuel separator, where the recycle line is in fluid communication with an outlet of the fuel separator and an inlet of the mixing zone.

5. The system of claim 1, where the plurality of flow channels are arranged in a honeycomb arrangement.

6. The system of claim 1, where the fuel intake comprises a fuel preheating zone configured to increase a temperature of the liquid hydrocarbon fuel.

7. The system of claim 1, where the monolith walls have a cell density of 100 cells per square inch to 1200 cells per square inch.

8. The system of claim 1, where the monolith walls have a pore density of 10 pores per inch to 60 pores per inch.

9. The system of claim 1, further comprising a reformed fuel vessel downstream of the catalyst reaction zone.

10. A vehicle comprising a gasoline compression engine and the system of claim 9, where a gasoline inlet of the gasoline compression engine is fluidly coupled to the reformed fuel vessel.

11. A process for reforming a liquid hydrocarbon fuel, the process comprising:
 passing a liquid hydrocarbon fuel and an oxygen-containing gas to at least one atomizing nozzle, where the at least one atomizing nozzle produces a plurality of droplets suspended in the oxygen-containing gas, where each of the plurality of droplets comprises the liquid hydrocarbon fuel;
 passing the plurality of droplets suspended in the oxygen-containing gas from the atomizing nozzle to a fuel distribution zone, where the fuel distribution zone distributes the plurality of droplets and the oxygen-containing gas to a plurality of flow channels in a monolith block; and
 contacting the plurality of droplets with the oxygen-containing gas in the presence of a reforming catalyst in the plurality of flow channels, where the reforming catalyst comprises N-hydroxyphthalimide (NHPI) and contacting the plurality of droplets with the oxygen-containing gas in the presence of the reforming catalyst causes at least a portion of the liquid hydrocarbon fuel to undergo one or more chemical reactions to produce a reformed liquid hydrocarbon fuel having a cetane number greater than a cetane number of the liquid hydrocarbon fuel.

12. The process of claim 11, further comprising heating the liquid hydrocarbon fuel to a temperature of at least 80 degrees Celsius in a fuel preheating zone within the fuel intake.

13. The process of claim 11, further comprising passing the liquid hydrocarbon fuel through the at least one atomizing nozzle at a liquid flow rate range of 300 cubic centimeters per hour to 69,000 cubic centimeters per hour.

14. The process of claim 11, further comprising passing the oxygen-containing gas through the at least one atomizing nozzle a gas flow rate range from 2,800 cubic centimeters per minute to 707,000 cubic centimeters per minute.

15. The process of claim 11, further comprising separating unreacted liquid hydrocarbon fuel from the reformed liquid hydrocarbon fuel.

16. The process of claim 15, further comprising recycling the unreacted liquid hydrocarbon fuel into a fuel intake and passing the reformed liquid hydrocarbon fuel through a fuel product outlet.

17. A method for reforming a liquid hydrocarbon fuel, the method comprising:
 introducing a liquid hydrocarbon fuel to a mixing zone through a fuel intake;
 introducing an oxygen-containing gas to the mixing zone through an oxygen-containing gas intake;
 mixing the liquid hydrocarbon fuel and the oxygen-containing gas in the mixing zone comprising at least one atomizing nozzle;
 producing a plurality of droplets to a fuel distribution zone downstream of the at least one atomizing nozzle, where the plurality of droplets comprise the liquid hydrocarbon fuel suspended in the oxygen-containing gas;
 distributing the plurality of droplets to a catalyst reaction zone comprising a monolith block having a plurality of flow channels defined by monolith walls and a reforming catalyst coated onto the monolith walls in the plurality of flow channels; and
 contacting the plurality of droplets with the oxygen-containing gas in the presence of the reforming catalyst in each of the plurality of flow channels, where the reforming catalyst comprises N-hydroxyphthalimide (NHPI).

18. The method of claim 17, further comprising separating unreacted liquid hydrocarbon fuel from reformed liquid hydrocarbon fuel.

19. The method of claim 18, further comprising recycling the unreacted liquid hydrocarbon fuel to the fuel intake and passing the reformed liquid hydrocarbon fuel through a fuel product outlet.

20. The method of claim 17, further comprising preheating the liquid hydrocarbon fuel to increase a hydrocarbon fuel temperature in a fuel preheating zone.

* * * * *